(12) United States Patent
Chen

(10) Patent No.: US 11,572,127 B2
(45) Date of Patent: Feb. 7, 2023

(54) SHOCK-ABSORBING FRONT FORK AND METHOD OF SHOCK-ABSORBING OF THE SAME

(71) Applicant: LIOW KO CO., LTD., Changhwa (TW)

(72) Inventor: Cheng Chung Chen, Changhwa (TW)

(73) Assignee: Liow Ko Co., Ltd., Changhwa (TW)

( * ) Notice: Subject to any disclaimer, the term of this patent is extended or adjusted under 35 U.S.C. 154(b) by 125 days.

(21) Appl. No.: 17/133,840

(22) Filed: Dec. 24, 2020

(65) Prior Publication Data

US 2022/0126945 A1 Apr. 28, 2022

(30) Foreign Application Priority Data

Oct. 26, 2020 (TW) .................................. 109137104

(51) Int. Cl.
| | | |
|---|---|---|
| *B62K 21/04* | (2006.01) | |
| *F16F 13/00* | (2006.01) | |
| *B62K 21/20* | (2006.01) | |
| *B62K 25/08* | (2006.01) | |

(52) U.S. Cl.
CPC .............. *B62K 25/08* (2013.01); *B62K 21/04* (2013.01); *B62K 21/20* (2013.01); *F16F 13/005* (2013.01); *F16F 2228/08* (2013.01); *F16F 2232/08* (2013.01); *F16F 2234/02* (2013.01)

(58) Field of Classification Search
CPC ................................. B62K 21/04; B62K 21/20
USPC ........................................................ 280/276
See application file for complete search history.

(56) References Cited

U.S. PATENT DOCUMENTS

| | | | | |
|---|---|---|---|---|
| 783,236 | A * | 2/1905 | Ashburn ................ | B62K 25/08 280/276 |
| 4,881,750 | A * | 11/1989 | Hartmann .............. | B62K 21/20 188/269 |
| 5,494,302 | A * | 2/1996 | Farris ..................... | B62K 25/08 280/283 |
| 9,085,337 | B2 * | 7/2015 | Jordan ................... | B62K 21/20 |
| 2009/0072459 | A1 * | 3/2009 | Tsai ....................... | B62K 21/20 267/216 |

(Continued)

FOREIGN PATENT DOCUMENTS

| | | | | | |
|---|---|---|---|---|---|
| CN | | 107914814 A | * | 4/2018 | ............ B62K 21/04 |
| DE | 202009002050 U1 | * | 9/2009 | ............ B62K 21/20 |

(Continued)

*Primary Examiner* — Kevin Hurley
*Assistant Examiner* — Hosam Shabara
(74) *Attorney, Agent, or Firm* — Rosenberg, Klein & Lee

(57) ABSTRACT

A shock-absorbing front fork for a bicycle includes an inner part securely inserted in the crown of the front fork. The inner part includes multiple first slots and second slots defined axially in the outside thereof. Each first slot receives a pin therein, and each second slot receives a roller therein. A rod extends through a dust-proof unit, a first ring and a spring. The lower section of the rod is connected to the top end of the inner part. An outer part is a tube which includes multiple first grooves and second grooves defined axially in the inner periphery thereof. The outer part is mounted to the inner part. The pins are partially accommodated in the first grooves, and the rollers are partially accommodated in the second grooves. The outer part is axially movable relative to the inner part by the pins and the rollers with less friction.

12 Claims, 9 Drawing Sheets

(56) References Cited

U.S. PATENT DOCUMENTS

2013/0119632 A1\* 5/2013 Liao ................ B62K 21/20
280/276

FOREIGN PATENT DOCUMENTS

| DE | 202013001250 | U1 * | 5/2013 | ............ | B62K 21/06 |
| DE | 102018002277 | A1 * | 9/2019 | ............ | B62K 21/14 |
| FR | 2921892 | A3 * | 4/2009 | ............ | B62K 21/20 |

\* cited by examiner

SHOCK-ABSORBING FRONT FORK AND METHOD OF SHOCK-ABSORBING OF THE SAME

BACKGROUND OF THE INVENTION

1. Fields of the Invention

The present invention relates to a shock-absorbing front fork for a bicycle.

2. Descriptions of Related Art

The conventional shock-absorbing front fork generally includes a shock-absorbing device in each of the two legs of the front fork so as to absorb shocks transferred from the road to the bicycle. Each shock-absorbing device includes a spring which generally is a compression spring so as to be deformed and compressed to absorb shocks. However, the features of the two springs reduce individually, such that the two springs cannot work in a balanced status. Besides, two springs increase manufacturing cost.

Another shock-absorbing device for bicycles as disclosed in Taiwanese Utility Model M365310 requires only one spring which is installed to the center of the crown of the front fork. Nevertheless, this shock-absorbing device involves high friction between parts thereby generating large gaps which create noise.

Besides, the springs cannot be adjusted according to the road condition and the users' needs. A larger gap may be formed between the moving tubes so that the spring may not properly absorb the shocks from the roads.

The present invention intends to provide a shock-absorbing front fork for a bicycle, and a method of shock-absorbing of a front fork to eliminate shortcomings mentioned above.

SUMMARY OF THE INVENTION

The present invention relates to a shock-absorbing front fork for a bicycle, and the front fork comprises a crown having a passage defined axially and centrally therethrough. A first leg and a second leg respectively extend from the crown. An inner part includes its lower section inserted into the passage of the crown, and a locking member is connected to the lower section of the inner part from the underside of the crown. The inner part includes multiple first slots defined axially in an outside thereof, and a pin is partially received in each of the first slots. A rod extends through a dust-proof unit, a first ring and a spring. The lower section of the rod is connected to the top end of the inner part. An outer part is a tube which includes multiple first grooves defined axially in the inner periphery thereof. The outer part is mounted to the inner part. The pins are partially accommodated in the first grooves. The spring, the upper section of the inner part and the rod are accommodated in the outer part. The outer part is axially movable relative to the inner part with the pins movable in the first slots and the first grooves.

The present invention also provides a method of shock-absorbing for a shock-absorbing front fork of a bicycle. The method comprises:

a step of choosing an installation position: choosing a top end of a crown of a front fork to be the installation position;

a step of installing a shock-absorbing device: installing a shock-absorbing device to the installation position, the shock-absorbing device including an outer part, an inner part, a rod and a spring, the rod extending through the a first ring of the outer part, the spring, and being connected to the top end of the inner part, the spring located between the outer part and the inner part, and a step of reducing friction: installing multiple pins and rollers between the outer part and the inner part, the pins guiding the outer part to move linearly, the rollers reducing friction between the outer part and the inner part.

The primary object of the present invention is to provide a shock-absorbing front fork for a bicycle, and a method of shock-absorbing for a shock-absorbing front fork of a bicycle, wherein the friction is reduced when the outer part is moved relative to the inner part. The present invention also allows the users to adjust the stiffness of the shock-absorbing front fork.

The advantages of the present invention are that the inner part includes multiple pins which are slidably located in the first grooves of the outer part so as to guide the outer part to move linearly. Besides, the rollers are rotatably located in the second grooves of the outer part to reduce friction between the outer part and the inner part.

When adjusting the stiffness of the shock-absorbing front fork, the rod is rotated by using a tool engaged with the polygonal recess in the top of the rod to adjust the compression distance of the spring.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
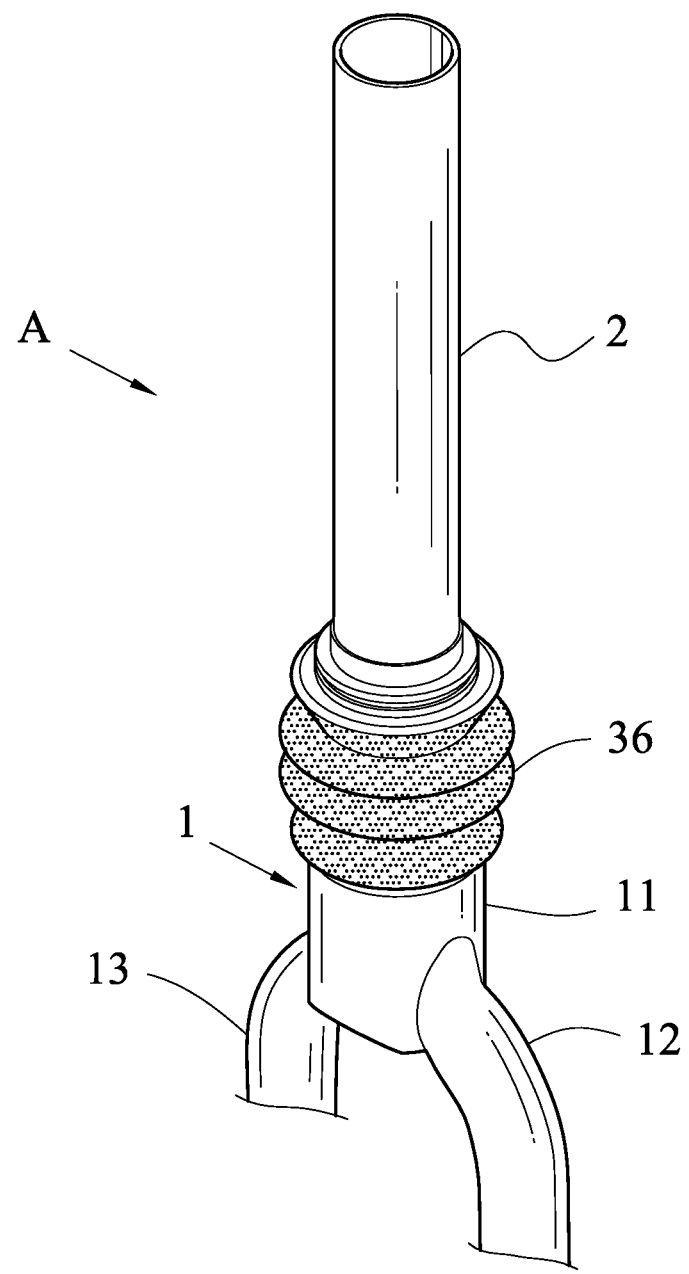
FIG. 1 is a perspective view to show the shock-absorbing front fork for a bicycle of the present invention.
Figure 2:
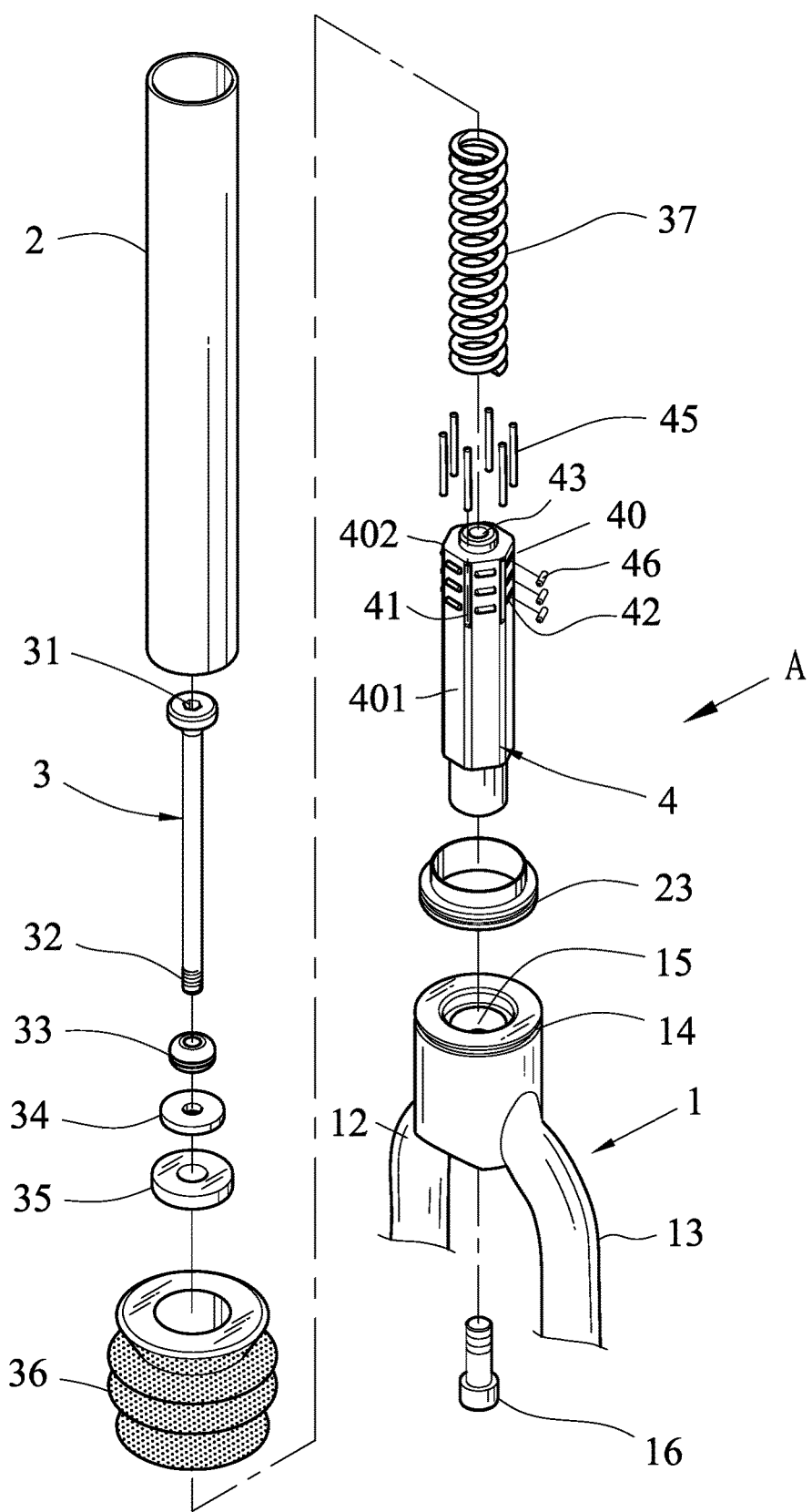
FIG. 2 is an exploded view to show the shock-absorbing front fork for a bicycle of the present invention.

Referring to FIGS. 1 and 2, the shock-absorbing front fork "A" for a bicycle of the present invention comprises a front fork 1, an outer part 2, a rod 3 and an inner part 4.

The front fork 1 includes a crown 11 with a first leg 12 and a second leg 13 respectively extending from the crown 11. A passage 15 is defined axially and centrally through the crown 11. A bottom connection portion 14 is formed to the crown 11.

Figure 4:
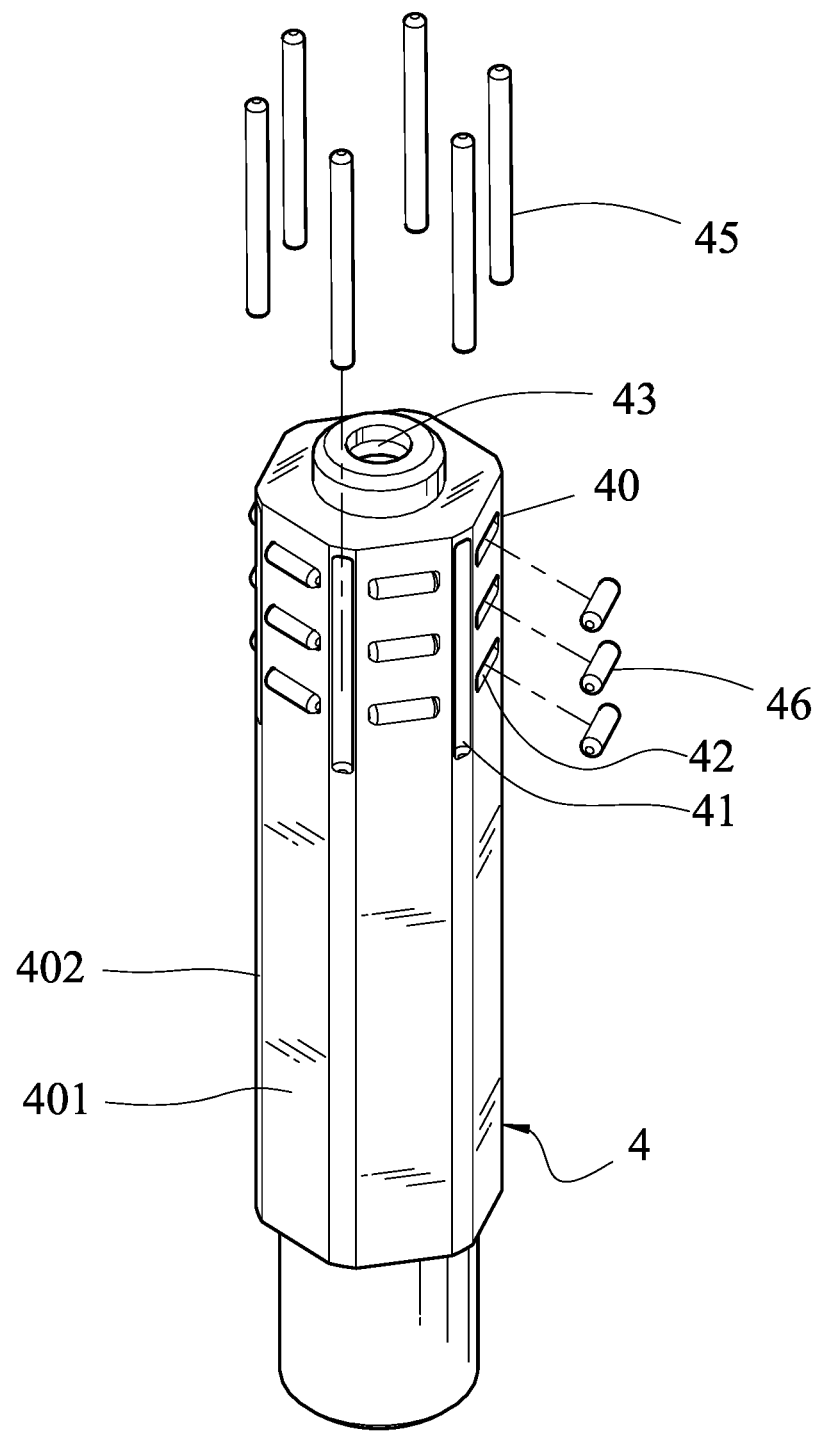
FIG. 4 shows the inner part and pins of the shock-absorbing front fork for a bicycle of the present invention.

As shown in FIGS. 2 and 4, the inner part 4 includes an upper section and a lower section which is smaller than the upper section, and the lower section is inserted into the passage 15 of the crown 11. A first threaded hole 43 is defined in the upper end of the inner part 4. A second threaded hole 44 is defined in the lower end of the inner part 4 so that a locking member 16 is threadedly connected to the second threaded hole 44 of the inner part 4 from the underside of the crown 11. The inner part 4 includes a function section 40 which includes multiple first slots 41 defined axially in the outside of inner part 4, and multiple second slots 42 defined transversely in the outside of the inner part 4. A pin 45 is partially received in each of the first slots 41, and a roller 46 is partially received in each of the second slots 42.

Figure 7:
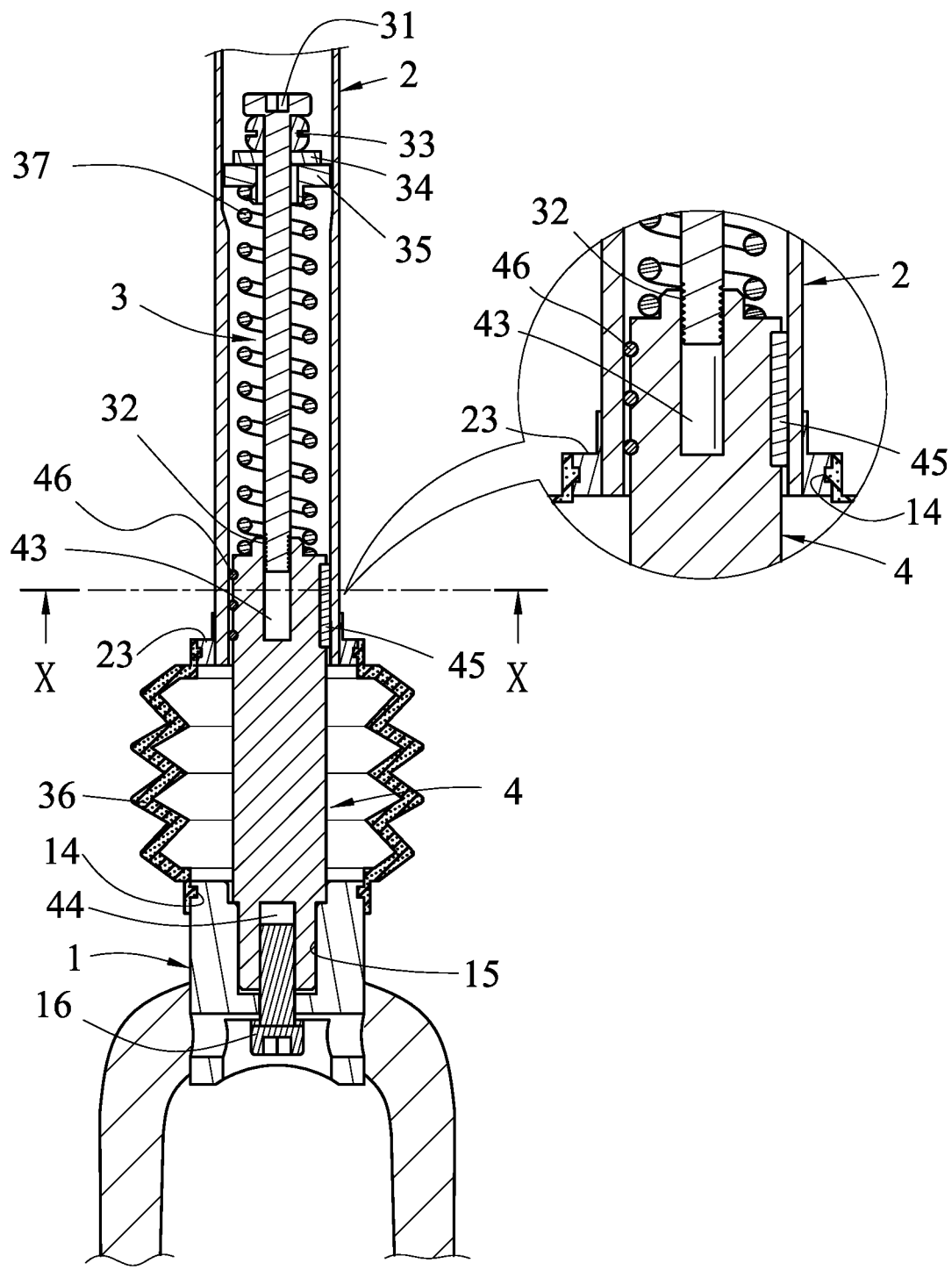
FIG. 7 is a cross sectional view, taken along line Y-Y in FIG. 3.

As shown in FIGS. 2 and 7, the rod 3 extends through a dust-proof unit, a second ring 33, a washer 34, a first ring 35 and a spring 37. The lower section of the rod 3 includes outer threads 32 which are connected to the first threaded hole 43 in the upper end of the inner part 4. The first ring 35 is fixed in the outer part 2. The second ring 33 is a buffering ring.

Figure 5:
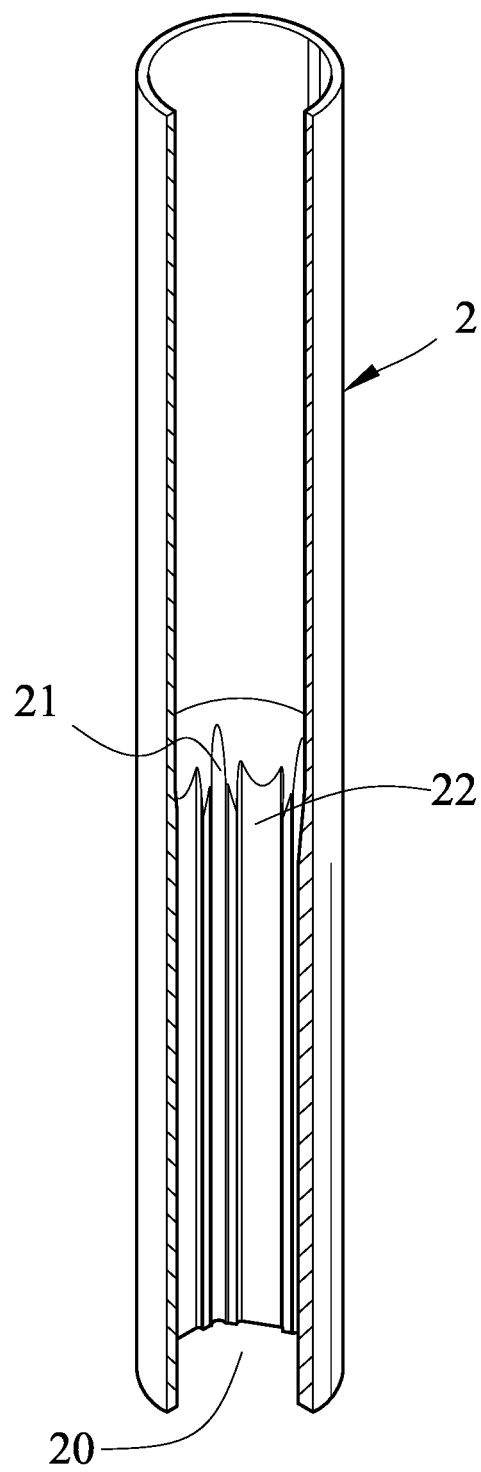
FIG. 5 shows the inner periphery of the outer part of the shock-absorbing front fork for a bicycle of the present invention.
Figure 6:
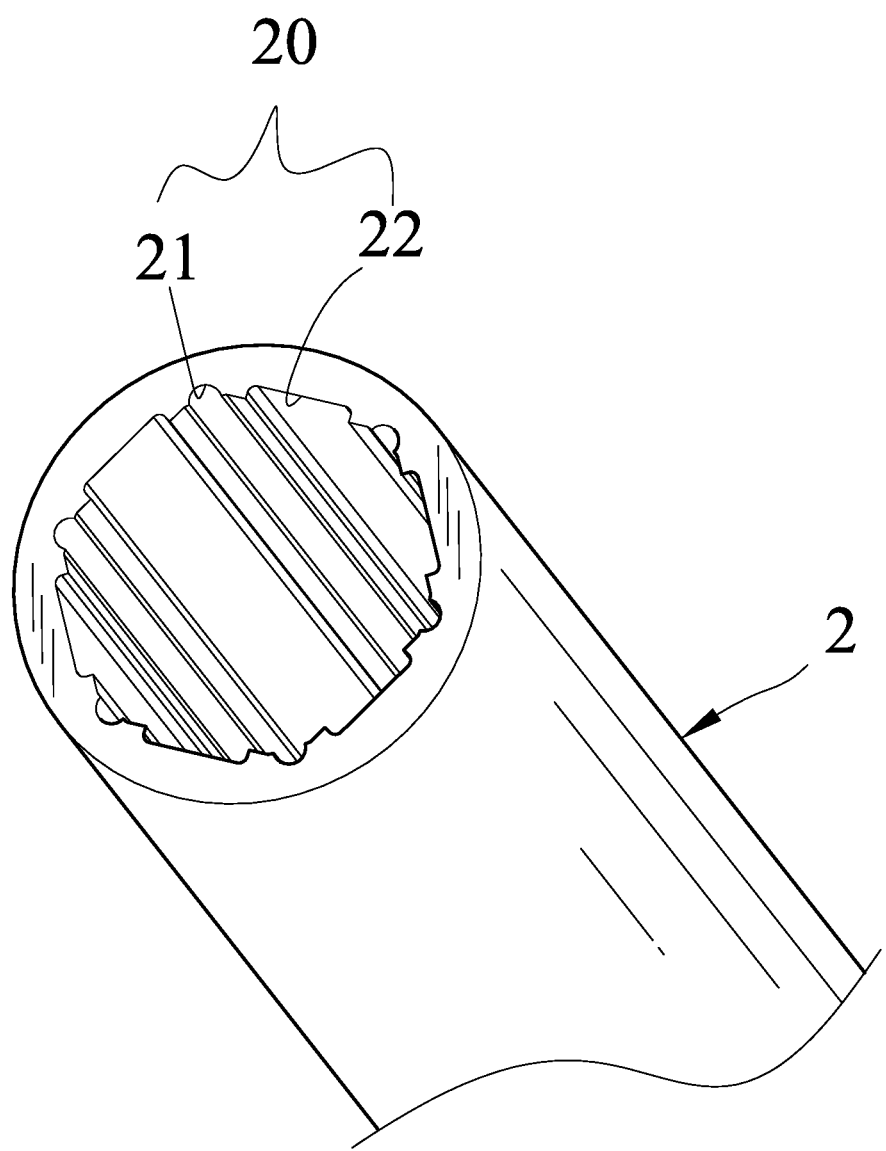
FIG. 6 shows the lower end of the outer part of the shock-absorbing front fork for a bicycle of the present invention.

As shown in FIGS. 2, 5 and 6, the outer part 2 is a tube which includes multiple first grooves 21 and multiple second grooves 22 defined axially in the inner periphery thereof. The first and second grooves 21, 22 extend from the lower end of the outer part 2 to the middle of the outer part 2 as shown in FIGS. 5 and 6. The first grooves 21 are alternatively located relative to the second grooves 22. When the outer part 2 is mounted to the inner part 4, the pins 45 are partially accommodated in the first grooves 21, and the rollers 46 are partially accommodated in the second grooves 22. The spring 37, the upper section of the inner part 4 and the rod 3 are accommodated in the outer part 2. As shown in FIG. 7, a top connection member 23 is connected to the lower end of the outer part 2. Two ends of the sleeve 36 are respectively positioned by the top connection member 23 and the bottom connection portion 14 formed to the crown 11. The sleeve 36 keeps the dust out from the inside of the front fork 1.

Figure 3:
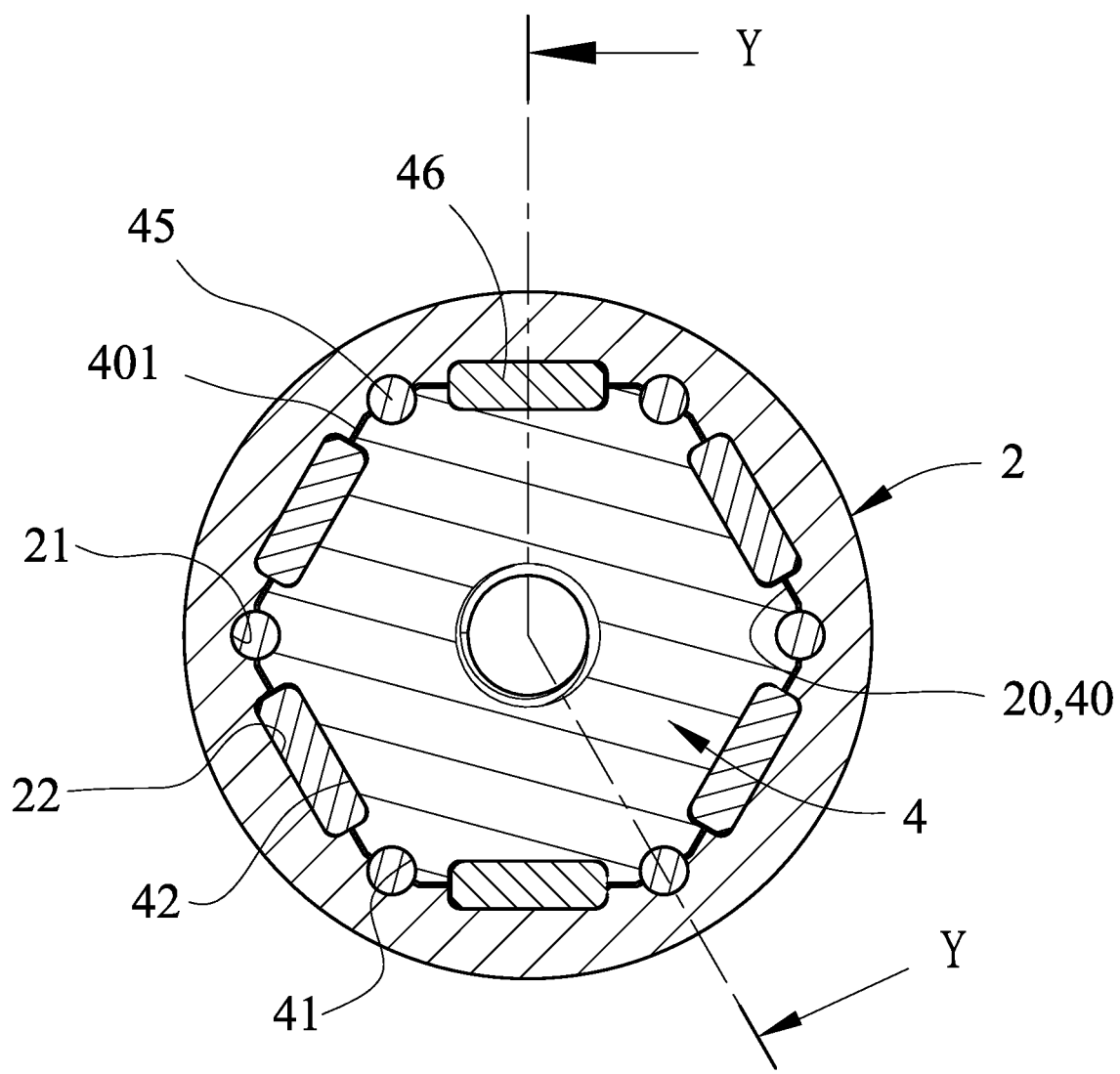
FIG. 3 is a cross sectional view, taken along line X-X in FIG. 1.

As shown in FIGS. 3 and 4, the inner part 4 includes a polygonal outside which includes multiple faces 401 and multiple corners 402 which are located alternatively to the faces 401. Each corner 402 includes one of the first slots 41, and each face 401 includes some of the second slots 42. The inner periphery of the outer part 2 includes an inner polygonal section 20 so that the inner part 4 is slidably received in the inner polygonal section 20. The inner polygonal section 20 of the outer part 2 includes the first and second grooves 21, 22 formed therein. The first grooves 21 are located to accommodate the pins 45, and the second grooves 22 are located to accommodate the rollers 46.

By the pins 45 and the rollers 46 located between the inner part 4 and the outer part 4, the friction is reduced when the outer part 2 is linearly moved relative to the inner part 4. Specifically, the pins 45 guide the outer part 2 to be exclusively linearly moved relative to the inner part 4. The rollers reduces the friction when the outer part 2 is linearly moved relative to the inner part 4, so as to prevent a large gap is formed between the outer part 2 and the inner part 4.

Figure 8:
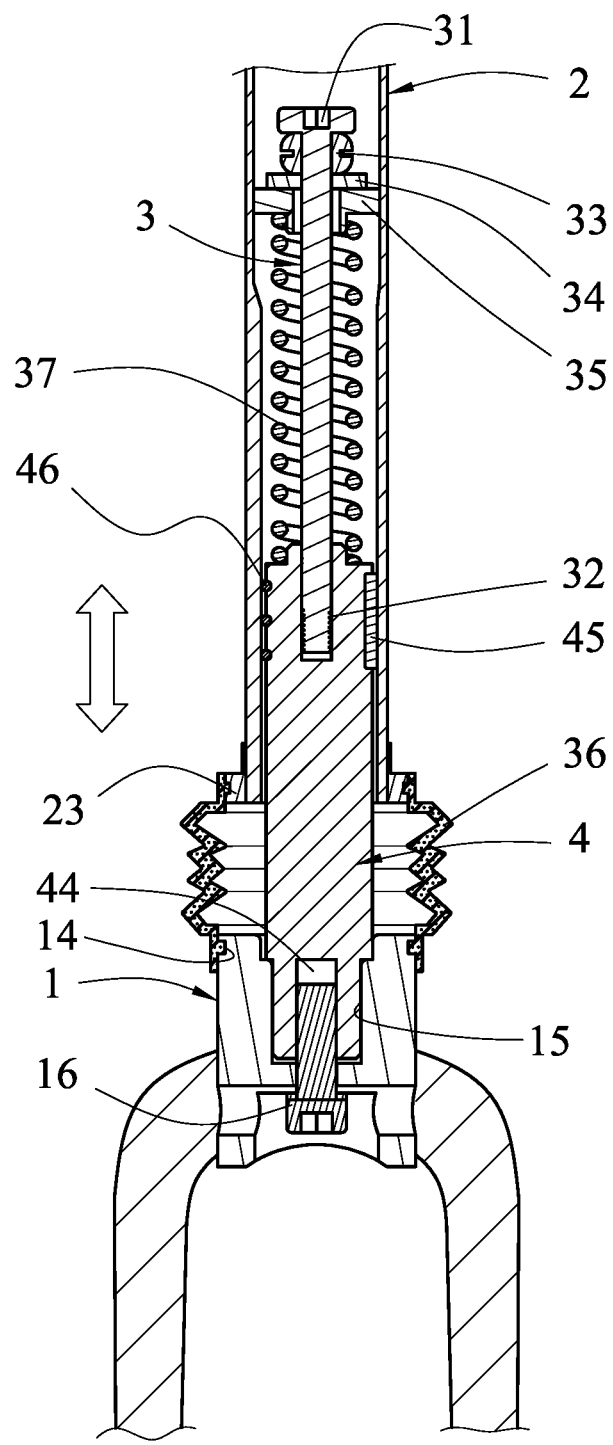
FIG. 8 is a cross sectional view to show the action of the shock-absorbing front fork for a bicycle of the present invention.

As shown in FIGS. 7 and 8, when shocks are transferred from the road to the crown 11 of the front fork 1 via the first and second legs 12, 13, the inner part 4 and the outer part 2 have relative movement so that the shocks are absorbed by the spring 37. The pins 45 and the rollers 46 ensure that the outer part 2 can only move linearly relative to the inner part 4, and the friction between the inner part 4 and the outer part 2 is reduced.

When adjusting the stiffness of the shock-absorbing front fork "A", a tool is used to be engaged with the polygonal recess 31 in the top end of the rod 3 so that the rod 3 is threadedly moved by the threaded engagement between the outer threads 32 of the rod 3 and the first threaded hole 43 of the inner part 4, such that the compression distance of the spring 37 is adjusted to achieve the adjustment purpose.

Figure 9:
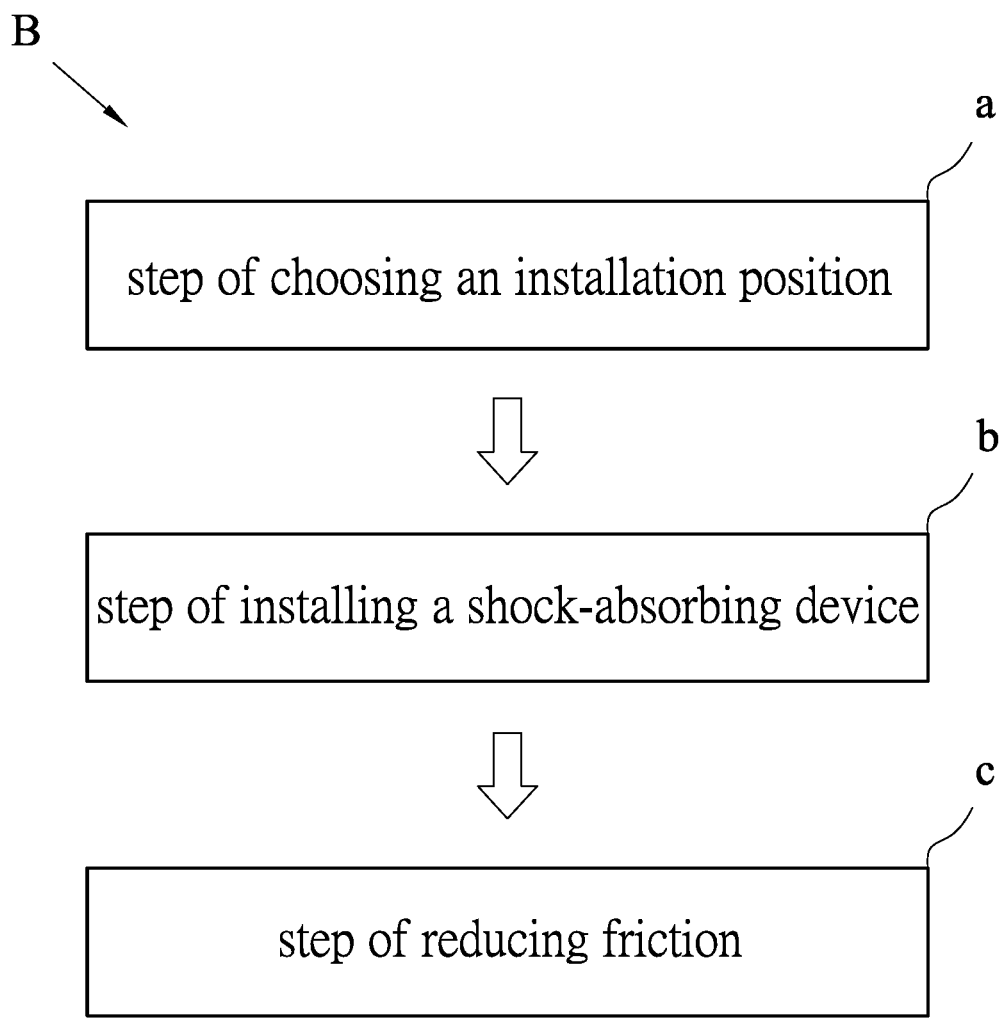
FIG. 9 illustrates the steps of the method of the present invention.

As shown in FIGS. 7 and 9, the method "B" of shock-absorbing for the shock-absorbing front fork "A" of the present invention, comprises the following steps:

a step "a" of choosing an installation position: choosing a top end of a crown of a front fork to be the installation position;

a step "b" of installing a shock-absorbing device: installing a shock-absorbing device to the installation position, the shock-absorbing device including an outer part 2, an inner part 4, a rod 3 and a spring 37, the rod 3 extending through the a first ring 35 of the outer part 2, the spring 37, and being connected to a top end of the inner part 4, the spring 37 located between the outer part 2 and the inner part 4, and a step "c" of reducing friction: installing multiple pins 45 and rollers 46 between the outer part 2 and the inner part 4, the pins 45 guiding the outer part 2 to move linearly, the rollers 46 reducing friction between the outer part 2 and the inner part 4.

While we have shown and described the embodiment in accordance with the present invention, it should be clear to those skilled in the art that further embodiments may be made without departing from the scope of the present invention.

What is claimed is:

1. A shock-absorbing front fork for a bicycle, comprising:
a fork having a crown, a first leg and a second leg extending from the crown, and a passage defined axially and centrally through the crown;
an inner part including a lower section inserted into the passage of the crown, a locking member connected to the lower section of the inner part from an underside of the crown, the inner part including multiple pins and multiple first slots defined axially in an outside thereof, each pin of the pins being partially received in a corresponding one of the first slots, the inner part further including a first threaded hole defined in a top end thereof, the inner part includes a second threaded hole defined in a lower end thereof, the locking member is threadedly connected to the second threaded hole of the inner part;
a rod extending through a dust-proof unit, a first ring and a spring, a lower section of the rod connected to the top end of the inner part, the rod including outer threads formed to the lower section of the rod, and the outer threads of the rod are engaged with the first threaded hole of the inner part; and
an outer part being a tube which includes multiple first grooves defined axially in an inner periphery thereof, the outer part mounted to the inner part, each pin of the pins being partially accommodated in a corresponding one of the first grooves, the spring, an upper section of the inner part and the rod accommodated in the outer part, the outer part being axially movable relative to the inner part, and the pins being movable in the first slots and the first grooves.

2. The shock-absorbing front fork as claimed in claim 1, wherein the inner part includes multiple rollers and multiple second slots defined transversely in the outside thereof, each roller of the multiple rollers is partially received in a corresponding one of the second slots, the outer part includes multiple second grooves defined axially in the inner periphery thereof, each roller of the multiple rollers being partially accommodated in a corresponding one of the second grooves.

3. The shock-absorbing front fork as claimed in claim 2, wherein the first grooves are alternatively located relative to the second grooves, the first and second grooves extend from a lower end of the outer part to a middle of the outer part.

4. The shock-absorbing front fork as claimed in claim 2, wherein the inner part includes a polygonal outside having multiple faces and multiple corners located alternatively to the faces, each corner includes one of the first slots, each face includes the second slots, the inner periphery of the outer part includes an inner polygonal section, thereby the inner part being slidably received in the inner polygonal section, the inner polygonal section of the outer part includes the first grooves and the second grooves formed therein, the first grooves are located to accommodate the pins, the second grooves are located to accommodate the rollers.

5. The shock-absorbing front fork as claimed in claim 2, wherein the inner part includes even-number first slots and even-number second slots.

6. The shock-absorbing front fork as claimed in claim 1, wherein the dust-proof unit includes a sleeve and a top connection member, two ends of the sleeve are respectively positioned by the top connection member and a bottom connection portion formed to the crown.

7. The shock-absorbing front fork as claimed in claim 1, wherein the rod extends through a second ring which is located above the first ring.

8. A method of shock-absorbing for a shock-absorbing front fork of a bicycle, comprising:
choosing an installation position: choosing a top end of a crown of a front fork to be the installation position;
installing a shock-absorbing device: installing a shock-absorbing device to the installation position, the shock-absorbing device including an outer part, an inner part, a rod, and a spring, the rod extending through a first ring of the outer part, the spring, and being connected to a top end of the inner part, the spring located between the outer part and the inner part, and
reducing friction: installing multiple pins and rollers between the outer part and the inner part, the pins guiding the outer part to move linearly, the rollers reducing friction between the outer part and the inner part.

9. A shock-absorbing front fork for a bicycle, comprising:
a fork having a crown, a first leg and a second leg extending from the crown, and a passage defined axially and centrally through the crown;
an inner part including a lower section inserted into the passage of the crown, a locking member connected to the lower section of the inner part from an underside of the crown, the inner part including multiple pins and multiple first slots defined axially in an outside thereof, each pin of the multiple pins being partially received in a corresponding one of the first slots, the inner part also including multiple rollers and multiple second slots defined transversely in the outside thereof, and each roller of the multiple rollers is partially received in a corresponding one of the second slots;
a rod extending through a dust-proof unit, a first ring and a spring, a lower section of the rod connected to a top end of the inner part; and
an outer part being a tube which includes multiple first grooves and multiple second grooves defined axially in an inner periphery thereof, the outer part mounted to the inner part, each pin of the pins being partially accommodated in a corresponding one of the first grooves, the spring, an upper section of the inner part and the rod being accommodated in the outer part, the outer part being axially movable relative to the inner part, the pins being movable in the first slots and the first grooves, and the rollers being partially accommodated in a corresponding one of the second grooves.

10. The shock-absorbing front fork as claimed in claim 9, wherein the first grooves are alternatively located relative to the second grooves, the first and second grooves extend from a lower end of the outer part to a middle of the outer part.

11. The shock-absorbing front fork as claimed in claim 9, wherein the inner part includes a polygonal outside having multiple faces and multiple corners located alternatively to the faces, each corner includes one of the first slots, each face includes the second slots, the inner periphery of the outer part includes an inner polygonal section, thereby the inner part is slidably received in the inner polygonal section, the inner polygonal section of the outer part includes the first grooves and the second grooves formed therein, the first grooves are located to accommodate the pins, the second grooves are located to accommodate the rollers.

12. The shock-absorbing front fork as claimed in claim 9, wherein the inner part includes even-number first slots and even-number second slots.

\* \* \* \* \*